Nov. 26, 1946.   H. E. SOMES   2,411,699
BLANK FOR INDUCTION HEATING HEADS
Filed Dec. 30, 1943   3 Sheets-Sheet 1
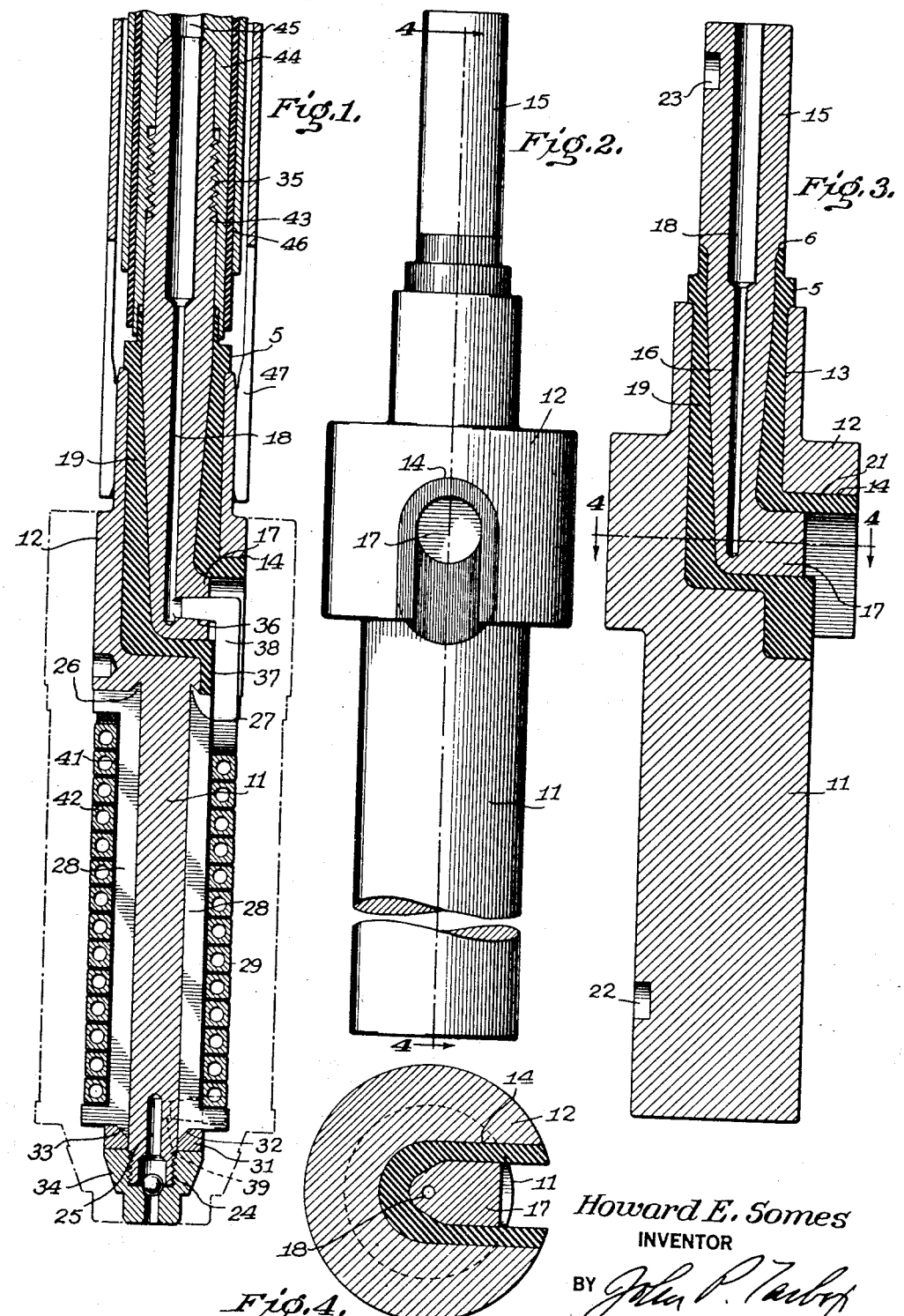
Howard E. Somes
INVENTOR Nov. 26, 1946.  H. E. SOMES  2,411,699
BLANK FOR INDUCTION HEATING HEADS
Filed Dec. 30, 1943  3 Sheets-Sheet 2

Howard E. Somes
INVENTOR

BY John P. Tarbox
ATTORNEY

Nov. 26, 1946.   H. E. SOMES   2,411,699
BLANK FOR INDUCTION HEATING HEADS
Filed Dec. 30, 1943   3 Sheets-Sheet 3
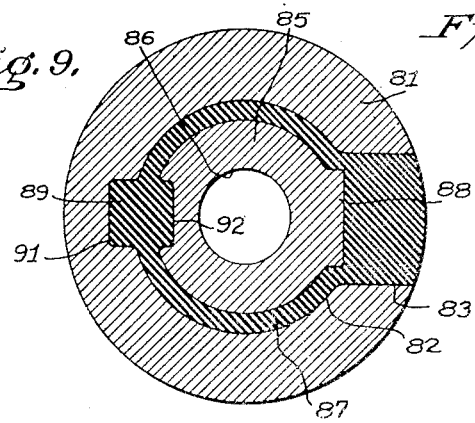
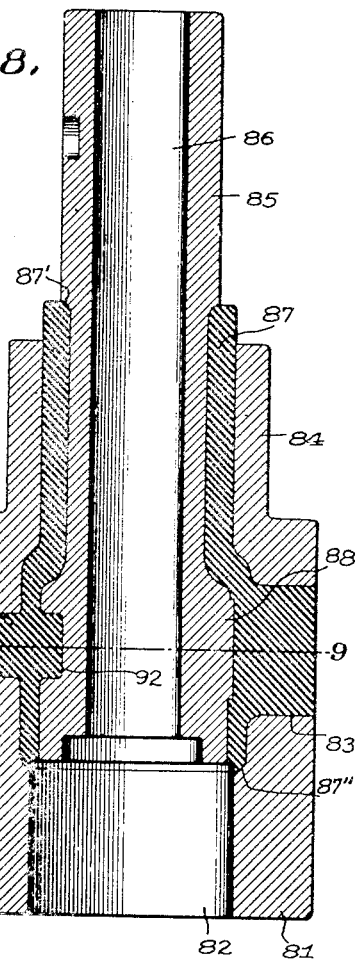
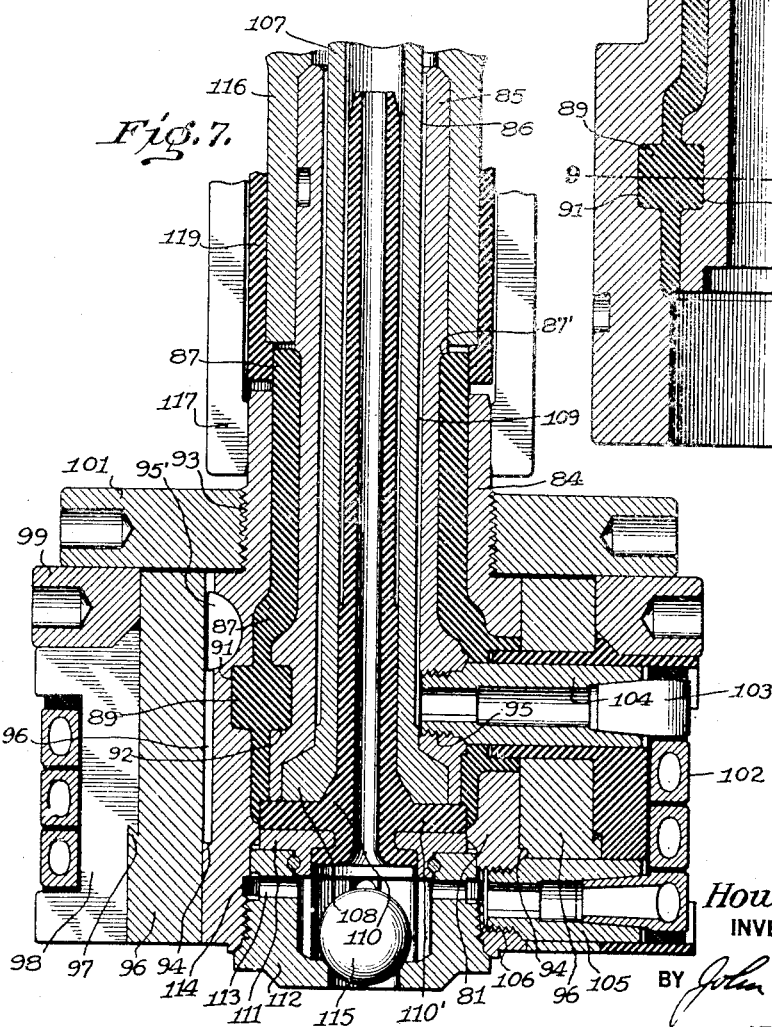
Howard E. Somes
INVENTOR
BY John P. Talbott
ATTORNEY Patented Nov. 26, 1946

2,411,699

UNITED STATES PATENT OFFICE 2,411,699

BLANK FOR INDUCTION HEATING HEADS

Howard E. Somes, Detroit, Mich., assignor, by mesne assignments, to The Budd Company, Philadelphia, Pa., a corporation of Pennsylvania Application December 30, 1943, Serial No. 516,181

4 Claims. (Cl. 29—190)

This invention relates to induction heating heads and their manufacture, and an object is to standardize the manufacture of what has heretofore always been a specialized and relatively costly operation.

The electromagnetic induction heating of interior surfaces such, for example, as the inner walls of cylinders, tubes, hubs, and the like, usually requires a head consisting of a coil supporting mandrel on which a suitable core is mounted and a heating coil wound around the cord. An electric current conducting arbor is connected to and supports the mandrel, the mandrel and arbor members being electrically insulated from each other. One terminal of the mandrel-supporting coil is connected to the arbor member, while the other terminal is connected to the mandrel. The mandrel and arbor members are, in turn, electrically connected to conductors leading to the opposite sides of a transformer coil for supplying heat inducing current to the working coil on the mandrel.

Inasmuch as the heating operation in which the heating head is employed usually requires a relatively close clearance between the heating coil and the surface of the workpiece, and inasmuch as, in the case of internal heating, the entire heating head must usually be passed entirely through the bore of the workpiece, it has been customary heretofore to individually design and manufacture each heating head according to the particular dimensions required for treating a specific workpiece. This process has required the special manufacture of each head and of its component parts.

A further object of this invention is to provide a standardized form of blank from which various sizes of induction heating heads can be easily and cheaply manufactured by ordinary machine operations.

These and other objects which will be apparent are accomplished by the invention hereinafter described and illustrated in the accompanying drawings in which:

Fig. 1 is a transverse sectional view illustrating one embodiment of a relatively small diameter induction heating head which can be produced by the present invention;

Fig. 2 is a broken side elevation of a head-forming blank constructed in accordance with one embodiment of this invention, from which the head illustrated in Fig. 1 can be made;

Fig. 3 is a transverse sectional view on the line 4—4 of Fig. 2;

Fig. 4 is a section on the line 4—4 of Fig. 3;

Fig. 7 is a view similar to Figs. 1 and 5 illustrating a still different head construction produced by this invention;

Fig. 8 is a sectional view of the blank employed in making the head of Fig. 7, and Fig. 9 is a section on the line 9—9 of Fig. 8.

Figure 5:
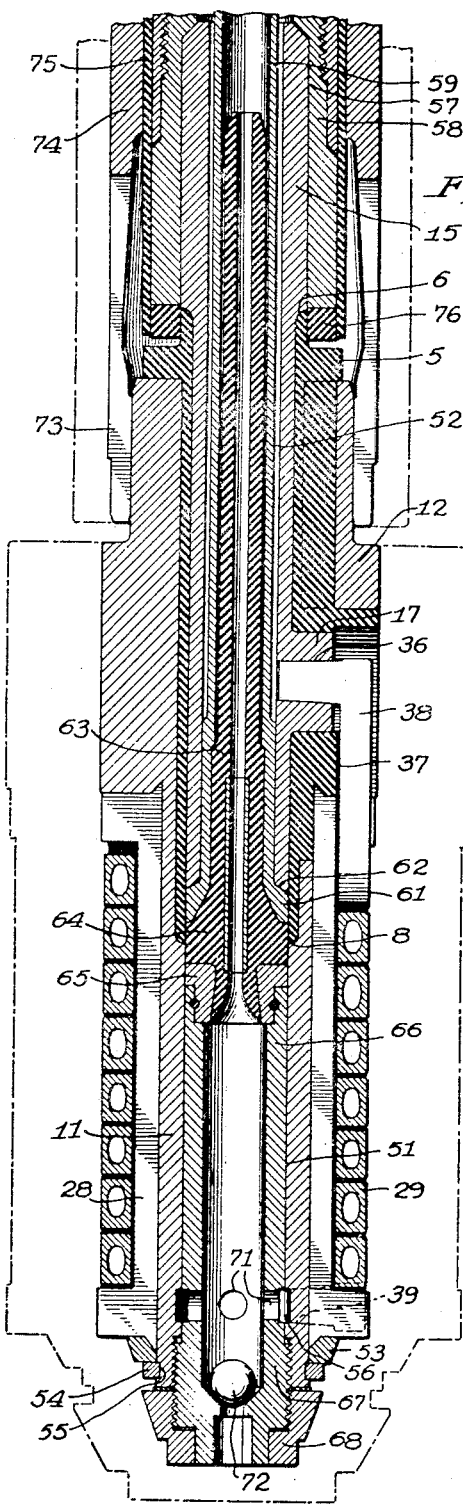
Fig. 5 is a view similar to Fig. 1 illustrating a different head construction produced by this invention.

In the present invention a heating head blank is formed by separate arbor and mandrel forming members which are connected together in substantial axial alignment by electrical insulating material interposed between and connecting together the two members. Interlocking surfaces are formed between the two members and the insulation so as to form a rigid unitary blank structure. The arbor and mandrel forming members are constructed and arranged to be shaped to any required size and configuration to a desired finished head by conventional machining operations, to adapt the mandrel for supporting a suitable coil and core, and to adapt the arbor member for connection to suitable current conducting and supporting members.

In actual practice, it may be found expedient to form a series of blanks of different sizes, each blank being adapted to form a series of different sizes of heating heads by machining down to any required dimensions less than those of the original blank. For example, a given blank can be used to produce a head having substantially the same dimensions as the blank, or it can be machined down to produce a head of any lesser diameter. Therefore, instead of forming a single head blank capable of producing the largest diameter head and turning it down to provide the smallest diameter head, which would require the removal of an excess amount of metal with resulting waste, it will be found desirable to provide a series of blanks of different sizes, each blank being adapted to be turned down a reasonable amount to provide heads of less diameter than the original blank.

In that embodiment of the invention which is illustrated in Figs. 1 to 4, a head forming blank is shown comprising a mandrel forming member 11 having an enlarged portion or collar 12 formed thereon adjacent one end. An axial bore 13 extends inwardly from the end adjacent the collar 12 to a point within the collar where it intersects a radial bore 14 extending inwardly from the side of the mandrel forming member 11.

An arbor-forming member 15 has a tapered end 16 adapted to be mounted in the axial bore 13 of the mandrel member 11. A radially extending enlargement or boss 17 on the end of the tapered portion 16 is positioned so as to project into the radial bore 14 of the mandrel member. The arbor-forming member 15 has an axially extending bore 18 extending inwardly from the outer end thereof to a point beneath the boss 17.

In forming the blank, the tapered end 16 of the arbor member 15 is positioned in the axial bore 13 of the mandrel member and the two members mounted in axial alignment with the boss 17 extending into the radial bore 14 of the mandrel member. Electrical insulating material in the form of a sleeve 19 surrounds the tapered arbor end 16 within the mandrel bore and the boss 17 is similarly electrically insulated from the mandrel member by insulation 21.

Both the arbor and mandrel forming members are preferably formed by casting a suitable current conducting copper alloy, or beryllium or other suitable metal. Preferably, the insulation 19 is a plastic which can be cast or molded in place between the assembled arbor and mandrel-forming members to join such members integrally together. As evident from Figs. 3 and 4, the arbor and mandrel members and the insulation have interlocking portions which results in all parts of the blank being rigidly connected together so that the finished blank can be readily formed into a heating head of any smaller size and configuration by conventional machining operations. For this purpose the insulation 19 is provided with a shoulder 5 engaging the end of the mandrel forming member 11, while the end of the insulation engages the shoulder 6 formed at the base of the tapered portion 16 of the arbor 15. Indexing slots 22 and 23 are formed in the mandrel and arbor members, respectively, in order to properly position them during the insulation molding operation so that the boss 17 will be properly centered in the radial bore 14.

Fig. 1 illustrates a solid mandrel type of heating head for which the blank shown in Figs. 2 and 3 is especially adapted. For this purpose, the mandrel portion 11 is turned down to predetermined diameter and is given a threaded end 24 with an axial opening 25 drilled into the end for a short distance. The inner end of the turned face is provided with a dovetailed groove 26 to receive the dovetailed projections 27 on the radially tapered laminations 28 forming the core on which the tubular heat inducing coil 29 is wound. The laminated core is secured in place by a washer 31, having a groove 32 engaging the dovetailed projections 33 at the lower ends of the laminations, pressed into place by a nut or similar fitting 34. In turning down the mandrel member 11 to the desired diameter, the shoulder 11 and adjacent end of the mandrel member are also turned down to predetermined size, and the projecting arbor member 15 is also turned down and provided with threads 35, the insulation 19 above the shoulder being turned down, but a thin layer being left for insulation purposes. The boss 17 is drilled to form a bore 36 communicating with the inner end of the axial passage 18, and the insulation 19 at the bottom of the bore 14 is grooved to provide a groove 37.

The laminations 28 are then stacked in place around the mandrel 11 and the coil 29 wound around the laminated core after the blank has been machined to the desired shape and size. The upper end 38 of the coil is extended through the insulated groove 37 and is secured in the radial bore 36 leading to the axial bore 18 of the arbor member. A radial passage 39 drilled in the lower end of the arbor member 11 to connect with the axial passage 25 is connected to the lower end of the tubular coil 29 to provide a continuous passage for the flow of coolant therethrough. As usual, a layer of insulation 41 is located between the various coil turns and the laminated core 28, while layers of insulation 42 separate the various turns from each other.

The connection between the lower end of the coil and the radial opening 39 also electrically connects this end of the coil with the mandrel member 11.

It will be apparent that the finished head of Fig. 1 can be made from the blank shown in Figs. 2 and 3 by simple inexpensive operations, and that the blank shown can be used to produce heads of varying size. The broken outline shown in Fig. 1 indicates approximately the largest size of head which would ordinarily be made by the blank of Fig. 2, while the solid lines show approximately the smallest diameter head.

The finished head will ordinarily be connected in place by threading the arbor member 15 into a threaded socket 43 formed in the lower end of a supporting electric conductor 44 having a bore 45 for conveying coolant to the head. An outer current conducting sleeve 46 has contact fingers 47 extending downwardly therefrom to electrically contact the upper end of the mandrel 11 above the shoulder 12. This establishes an electric circuit from the conductor 44 through the arbor member 15, coil 29, mandrel member 11, fingers 47, and outer conductor member 46. A sleeve 48 of insulation surrounds the conductor 44 and cooperates with the upper end of the insulation 19 of the blank to entirely enclose the inner conducting members.

Figure 6:
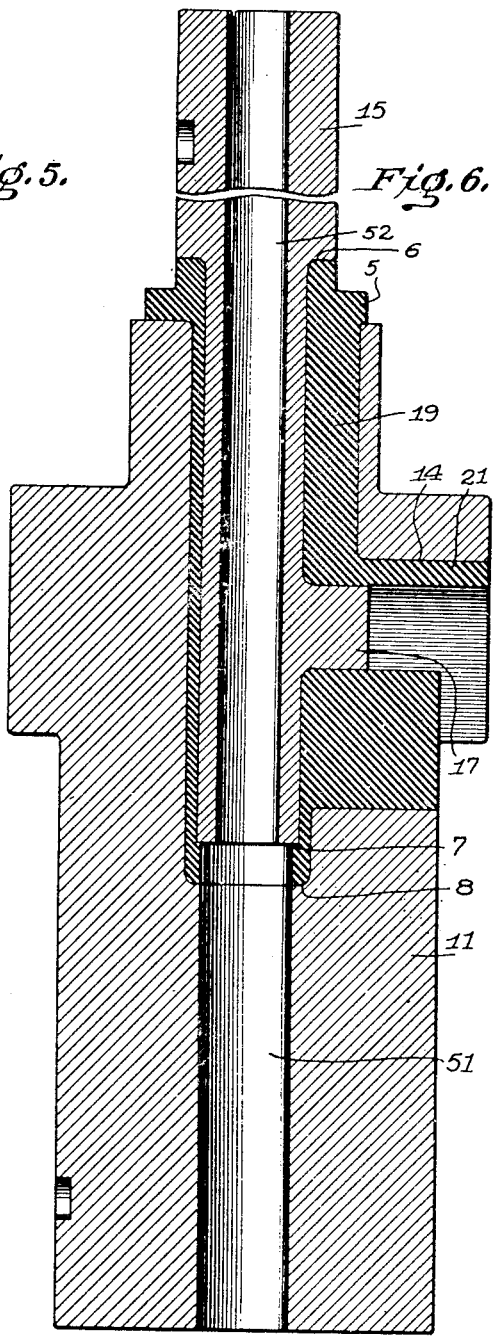
Fig. 6 is a section through a heating head blank employed in making the head of Fig. 5.

Figs. 5 and 6 illustrate the application of the invention to the manufacture of a different form of heating head. As shown in Fig. 6, the mandrel-forming member 11 is provided with an axial bore 51 extending entirely therethrough, and the arbor-forming member 15 has an axial bore 52 extending entirely through that member, so that the finished blank has an axial bore extending entirely through the blank from end to end. That portion of the bore 51 passing through the enlarged section 12 is somewhat enlarged over the remaining portion of the bore to receive the insulation 19 which is preferably molded in place to join the two members. As in the case of the blank illustrated in Figs. 2 and 3, the arbor member 15 has a boss 17 projecting into the radial bore 14 and surrounded by insulation which locks the parts together against relative rotation or longitudinal movement. The shoulder forming collar 5 on the insulation engages the end of the mandrel member 11 while the upper end of the insulation abuts the shoulder 6 on the arbor member 15, similar to the blank of Fig. 3. The lower end of the arbor member 15 engages a shoulder 7 on the surrounding insulation 19 which, in turn, engages a shoulder 8 on the inner bore of the mandrel member.

Fig. 5 shows the type of hollow heating head for which the blank of Fig. 6 is particularly adapted. The mandrel member 11 is turned down to the form shown and the inner bore is enlarged slightly and a beveled shoulder 62 formed on the bottom of the arbor member. The same laminations 28 are secured in place by a washer 53 held in place by a split ring 54 keyed in a slot 55 cut in the outer face of the lower end of the reduced mandrel member 11. The tubular coil 29 is wound in place and insulated in the manner above described, the upper end 38 extending through the insulated groove 37 and secured in the radial bore 36 formed in the boss 17 and connected with the axial bore 52 of the arbor member 15. The lower end of the heating coil is secured in or connected to the radial opening 39 in the lower end of the mandrel member 11. This opening communicates with an inner chamber 56 in the inner wall of the arbor member 11.

The head shown in Fig. 5 is supported in place, with the upper end of the arbor member 15 positioned in a socket 57 in an electric current conducting member 58, by a tubular supporting member 59 which has a lower collared end 61 engaging the shoulder 62 formed at the lower end of the arbor member 15 within the mandrel member 11. The tubular supporting member 59 is moved into position through the axial bore 51 of the mandrel member and its outer diameter is for the greater part sufficiently less than the diameter of the axial passage 52 in the arbor member 15 to provide space for the flow of coolant therebetween. The tubular supporting member 59 is held in place within the heating head by a tube 63 of insulating material having a head 64 vulcanized to an annular collar 65 which is rotatably keyed in the upper end of a sleeve 66 extending downwardly through the axial passage 51 and having a threaded end 67 threaded in part to the lower end of the mandrel member. A fitting 68 threaded to the projecting end of the sleeve 67 and engaging the end of the mandrel member 11 acts as a lock nut to secure the parts together. The sleeve 66 has a plurality of radial passages 71 through which coolant flows through the lower end of the tubular coil 29 to the interior of the sleeve 66 and outwardly through a ball valve 72.

In the form shown in Fig. 5, the conductor 57 is electrically connected to one end of the coil through the arbor member 15 while the other end of the coil is electrically connected, through the mandrel 11 and contact fingers 73 engaging the upper surface of the mandrell 11, with the outer conductor 74 surrounding and insulated from the inner conductor 57 by an insulating sleeve 75. A ring 76 of insulation material cooperates with the lower end of sleeve 75 and with the upper end of the blank insulation 19 to entirely enclose the lower end of the conducting member 58.

As in the case of the blank illustrated in Figs. 2 and 3, that shown in Fig. 6 is also formed by casting the arbor and mandrel members from any suitable conducting material and then joining them together by means of the intervening insulation 19, preferably molded as described. The blank of Fig. 6 can be employed to make a series of induction heating heads ranging in size from that shown by the broken lines of Fig. 5 to the smaller size fully illustrated in solid lines. To do so, the blank of Fig. 6 is machined to required shape and size, the laminations 28 are stacked in place around the mandrell 11 to provide the supporting core, and the coil 29 is wound thereon and insulated therefrom. The various supporting fittings are mounted in position at the time the head is secured to the supporting conductors. In this type of heating head, there is a continuous flow of coolant through the heating coil, being delivered thereto through the annular passage between the tubular supporting member 59 and the axial passage 52 in the arbor member 15, thence to the upper end of the tubular coil 38, then through the coil and outwardly through the lower end thereof to the chamber 56, radial passages 71 and interior of the sleeve 66 from which it flows outwardly through the hollow insulating tube 63 and supporting tubular member 59. Under certain conditions of use, the ball valve 72 will be opened to permit accelerated flow of coolant through the conductor 29 by accelerating the discharge downwardly through the ball valve.

Figs. 8 and 9 illustrate a somewhat modified form of blank for use in forming the hollow heating head shown in Fig. 7. In this form a mandrel member 81 having a bore 82 extending therethrough is provided with a radial bore 83 intersecting the axial bore about midway of the length of the mandrel member. The upper end 84 of the mandrel member is of reduced outside diameter. An elongated arbor member 85 having an axial bore 86 extending therethrough is telescoped within one end of the mandrel member to which it is joined by an intervening tube 87 of insulation which surrounds a portion of reduced diameter and engages a shoulder 87' on the arbor member and a shoulder 87'' on the mandrel member. Opposite the radial bore 83, the arbor member is provided with a thickened cross-section 88, and the insulating material has a rectangular enlargement 89 interlocking with recesses 91 and 92 in the mandrel and arbor members for locking the parts against relative rotation and longitudinal movement.

The blank shown in Fig. 8 is particularly adapted for the construction of heating heads of relatively large diameter such, for example, as the head shown in Fig. 7. In this form, the blank is first turned to the diameter and configuration shown, the reduced end 84 of the mandrel member being provided with threads 93, and an annular shoulder 94. The threaded opening 95 is formed in the large portion 88 and the insulation filling the bore 83 is cut and shaped as shown. In this form, in order to obtain the desired diameter of heating coil, a spacer ring 96 is mounted on the outer face of the mandrel member 81 and is supported on the shoulder 94. The spacer is held against rotation by a key 95' engaging a key slot 96' in the spacer. The outer face of the spacer ring 96 has a dovetailed slot 97 for receiving the similarly shaped projections on the laminations 98 which are stacked around the ring 96 and held in place thereon by a fastening ring 99 secured in place by a clamping ring 101 threaded to the threads 93 on the mandrel member. The tubular heating coil 102 is wound on the core and insulated therefrom in the usual way, the upper end 103 of the coil fitting into a sleeve connector 104 extending into and secured in the threaded opening 95 of the arbor member through the surrounding insulation 87, and the lower end of the coil is secured to a similar sleeve connector 105 secured in a threaded opening 106 in the mandrel member 81.

When in use, the head of Fig. 7 as above constructed, is supported on the tubular supporting member 107 adapted to be inserted through the bottom of the head and having a shouldered end 108 engaging the lower face of the arbor member 85, the outer diameter of the tubular supporting member 107 being sufficiently less than the axial bore 86 of the arbor member 85 to form a fluid passage 109 communicating with the upper end of the coil 103 through the hollow connector 104. A tubular insulating member 110 extends upwardly through the tubular supporting member 107 and has a head 110' vulcanized to a retaining ring 111 rotatably keyed to an annular fitting 112 threaded into the lower end of the mandrel 81. The insulating head 110' fits within the lower end of blank insulation 87 to enclose arbor member 85. The fitting has radial passages 113 communicating with an annular chamber 114 in the inner wall of the mandrel member. It receives fluid from the lower end of the heating coil 102 through the hollow connector 105. The end of the fitting 112 is formed by a ball valve 115.

A tubular member 107 supports the head with the arbor member 85 in electrical contact with a conducting sleeve 116, while the reduced portion of the mandrel member 81 engages conducting fingers 117 insulated from the sleeve 116 by intervening insulation 119 adapted to contact with the upper edge of the head insulation 87. As a result, electrical contact is made from the conducting sleeve 116 through arbor member 85, coil connector 104, coil 102, connector 105, mandrel member 81, and contact fingers 117. The flow of coolant through this head is similar to that described above in connection with the head shown in Fig. 5. It need not be here repeated.

In making up the head of Fig. 7 from the form of mandrel shown in Fig. 8, the mandrel is turned to suitable size and shape, a spacer ring 86 of suitable form is mounted in position and the laminations are stacked thereon. The laminations are then wound with the coil 102 which is insulated and the parts are secured together by the clamping nut 101. When put in use the head, so formed, is mounted on the tubular supporting member 107 and the ball valve fitting is secured in place.

It will be apparent that the present invention standardizes the manufacture of induction heating heads, and results in all the advantages and savings inherent in standardized manufacturing operations.

What is claimed is:

1. A blank for use in making induction heating heads of variable size comprising a mandrel-forming member having a diameter sufficient for the largest diametered head to be made therefrom, said member having a bore extending axially inwardly from one end thereof and an aperture through the wall of said bore, an arbor-forming member having one end disposed within said bore in spaced relation with respect thereto and a terminal-forming portion aligned with said aperture, and a unitary body of electrical insulation material insulating said end of said arbor-forming member from the walls of said bore, said insulating material extending about said terminal-forming portion and having an integral portion extending laterally in contact with the wall of said aperture.

2. A blank for use in making induction heating heads of variable size comprising a mandrel-forming member, said member having an integral circumferential portion of greater diameter than adjacent portions thereof, a bore extending axially inwardly from one end thereof and an aperture extending through the wall of said bore, said aperture being of oblong formation and arranged partially in said portion of greater diameter and partially in an adjacent portion of said member, an arbor-forming member having one end disposed in said bore coaxial therewith and spaced from the wall of said bore, a portion of said arbor-forming member being aligned with said aperture, and a one-piece body of electrical insulation disposed between the wall of said bore and said one end of said arbor-forming member, said insulation extending through said aperture flush with the circumferential surfaces of said portion of greater diameter and said last-named adjacent portion.

3. A blank for use in making induction heating heads of variable size comprising a mandrel-forming member having a diameter sufficient for the largest diametered head to be made therefrom, said member having a bore extending axially inwardly from one end thereof and an aperture through the wall of said bore, an arbor-forming member disposed within said bore in spaced relation with respect to the walls thereof and having an integral lateral terminal-forming portion extending into said aperture, and a body of electrical insulation surrounding said arbor-forming member and contacting the wall of said bore, said body having an integral laterally extending portion surrounding said terminal-forming portion and engaging the wall of said aperture.

4. A blank for use in making induction heating heads comprising a mandrel-forming member having an integral portion of greater diameter than an adjacent portion and providing an annular shoulder, said member having a bore extending axially from one end thereof and a recess in said portion of greater diameter, said recess opening through the shoulder and peripheral surface of said portion of greater diameter and through the wall thereof into said bore, an arbor-forming member disposed within said bore in spaced relation with respect to the wall thereof and having a terminal-forming portion aligned with said recess, and a one-piece body of electrical insulation insulating said arbor-forming member from the walls of said bore and having an integral lateral portion surrounding said terminal portion and extending through said recess, said lateral portion radially outwardly of the periphery of said adjacent portion having a recess extending longitudinally from the radial plane of said shoulder.

HOWARD E. SOMES.